United States Patent
Hoffmann et al.

(10) Patent No.: US 9,325,888 B2
(45) Date of Patent: Apr. 26, 2016

(54) METHOD AND LIGHT PATTERN FOR MEASURING THE HEIGHT OR THE HEIGHT PROFILE OF AN OBJECT

(71) Applicant: VITRONIC Dr.—Ing. Stein Bildverarbeitungssysteme GmbH

(72) Inventors: Burghard Hoffmann, Taunusstein (DE); Ingo Tzschichholtz, Wiesbaden (DE)

(73) Assignee: VITRONIC Dr.-Ing. Stein Bildverarbeitungssyteme GmbH, Wiesbaden (DE)

( * ) Notice: Subject to any disclaimer, the term of this patent is extended or adjusted under 35 U.S.C. 154(b) by 256 days.

(21) Appl. No.: 14/066,407

(22) Filed: Oct. 29, 2013

(65) Prior Publication Data

US 2014/0118538 A1  May 1, 2014

(30) Foreign Application Priority Data

Oct. 31, 2012 (EP) .................................... 12190830

(51) Int. Cl.
*G01B 11/02* (2006.01)
*H04N 5/225* (2006.01)
*G01B 11/04* (2006.01)
*G01B 11/25* (2006.01)
*G01B 11/06* (2006.01)

(52) U.S. Cl.
CPC .......... *H04N 5/2256* (2013.01); *G01B 11/0608* (2013.01); *G01B 11/0691* (2013.01); *G01B 11/25* (2013.01); *G01B 11/2522* (2013.01)

(58) Field of Classification Search
CPC ............................ G01B 11/022; H04N 5/2256
USPC ........................................................ 348/136
See application file for complete search history.

(56) References Cited

U.S. PATENT DOCUMENTS

| 2008/0156619 | A1* | 7/2008 | Patel ................. G01B 11/0691 198/502.2 |
| 2009/0161966 | A1 | 6/2009 | Lim |
| 2011/0075156 | A1 | 3/2011 | Patel et al. |
| 2015/0103358 | A1* | 4/2015 | Flascher ................ G01B 11/25 356/603 |

FOREIGN PATENT DOCUMENTS

| DE | 102007057771 A1 | 7/2008 |
| WO | 2004083778 A1 | 9/2004 |
| WO | 2007059780 A1 | 5/2007 |

* cited by examiner

Primary Examiner — Hee-Yong Kim
(74) Attorney, Agent, or Firm — Dinsmore & Shohl LLP

(57) ABSTRACT

A method for measuring the height of an object, including projecting a light pattern having successive coded picture elements extending in a direction of a transversal axis onto the object by a light source. Each of the picture elements has at least one coding feature and the picture elements together define a code word. The picture element groups from a sequence of a predetermined number of successive picture elements each define individual partial code words, existing exactly once within the code word. Capturing the light pattern by a picture sensor arranged off-set to the light source. Determining the positions of the picture element groups and determining the height of the object the determined position of the picture element groups in comparison to a respective reference position.

9 Claims, 2 Drawing Sheets

METHOD AND LIGHT PATTERN FOR MEASURING THE HEIGHT OR THE HEIGHT PROFILE OF AN OBJECT

CROSS-REFERENCE TO RELATED APPLICATIONS

This application claims priority to European Patent Application 12190830.5 filed Oct. 31, 2012, which is herein incorporated by reference in its entirety.

FIELD OF THE INVENTION

The invention relates to a method for measuring the height or the height profile of an object, wherein the method comprises the following steps: projecting a light pattern in form of successive coded picture elements in an extension in direction of a transversal axis onto the object by means of a light source, wherein each of the picture elements has at least one coding feature and the picture elements define together a code word, wherein picture element groups from a sequence of a predetermined number of successive picture elements each define individual partial code words, existing exactly once within the code word, wherein directly neighbouring picture element groups comprise partially the same picture elements and wherein each picture element group is assigned to a specific reference position in direction of the transversal axis in relation to a reference plane; capturing the light pattern by means of a picture sensor, which is arranged off-set to the light source; determining the positions in direction of the transversal axis of the picture element groups and determining the height of the object by means of the determined position of the picture element groups in comparison to the respective reference position.

Furthermore, the invention relates to a light pattern for use in a method for measuring the height or the height profile of an object, wherein the light pattern has in an extension in direction of a transversal axis successive coded picture elements, which have each at least one coding feature and define together a code word, wherein picture element groups from a sequence of a predetermined number of successive picture elements each define individual partial code words, wherein each picture element group is assigned to a specific reference position in direction of the transversal axis in relation to a reference plane and wherein two directly neighbouring picture element groups comprise partially the same picture elements.

BACKGROUND OF THE INVENTION

An above described method and an above described light pattern are known from WO 2004/083778 A1. There the method is used for scanning the surface profile of an object. From DE 10 2007 057 771 A1 a method and a device are known, which are mainly used for the volume determination of packages in packages sorting plants, wherein the packages are transported on conveying systems. The conveying system can comprise one or more conveyor belts or several conveyor rollers driven one after the other, on which the to be measured packages are conveyed. The device for measuring the height or the height profile of an object or a package is in this case arranged stationary and can for example comprise a bridge across the conveyor belt or the conveyor rollers, which is arranged transversally to the conveying direction and on which the individual components of the device are mounted. The device comprises further a linear picture sensor, which is arranged transversally to a conveying direction of the conveying system. Furthermore, at least one light source is provided, which is collinear to the linear picture sensor and is arranged laterally off-set thereto. The light source produces a distinct patterned light sequence across the width of the conveying system and the moving surface. This light sequence is reflected and recorded by the linear picture sensor. Thus, the light sequence is initially projected onto the conveyor belt transversally to the conveying direction. The linear picture sensor captures this light sequence from a position, laterally off-set in relation to the light source. Packages are moved by the conveyor belt through the light sequence. Here because of the off-set arrangement of the linear picture sensor, an off-set of the part of the light sequence, which is reflected by the package, is produced in a direction of the longitudinal extension of the light sequence, i.e. transversally to the conveying direction. This off-set or this displacement of the part of the light sequence, reflected by the package, is proportional to the height of the package, so that then, by means of the width of the displaced portion of the light sequence, the conveying speed and the size of the off-set, the volume of the package can be derived.

The light sequence is a spatial distinct bar arrangement, which is produced by a laser illumination device, which comprises a diffraction lens (DOE, diffractive optical element). The spatial distinct bar arrangement comprises a row of illuminated long bars and illuminated short bars. These are separated from each other by short empty spaces and long empty spaces. Thus, the bar arrangement can be compared with a bar code. The bar arrangement contains 199 code words, wherein one code word is determined by six elements. An element is an illuminated bar or an empty (not illuminated) space. The code words are arranged sequentially one after the other. The distinct pattern is determined by 78 words and is repeated three times across the width of the conveyor belt. Thus, within one of the three distinct patterns, each individual code word can be determined and identified, wherein then, also the position of the code word is known across the width of the conveyor belt. Thus, when the code word is off-set, the size of the off-set and thus the height of the package can be determined.

The problem is, that it has to be differentiated between long and short illuminated bars and between long and short empty (not illuminated) spaces. This can lead to problems in practice, when packages with different surfaces, e.g. light and dark surfaces, are sorted. Light surfaces reflect the light pattern stronger than dark surfaces, so that excessive irradiation produced. Excessive irradiation is characterised in that the correspondingly excessive illuminated bar seems to be longer on the picture captured by the linear picture sensor than a normal illuminated bar, which for example is reflected by a dark surface. Furthermore, when two excessive illuminated bars are arranged next to each other, the empty space can seem to be narrower. This phenomena can lead to a wrong determination or no determination of a code word.

Furthermore, picture sensors have a depth of focus, which can lead at the edge of areas of depth of sharpness to be out of focus. Being out of focus leads also to the phenomena, that an illuminated bar is reproduced wider than it is actually and correspondingly empty non-illuminated spaces between two represented or reproduced illuminated bars being out of focus seem to be narrower.

Furthermore, in principle a complete code word has to be read or determined. In code words, arranged sequentially one after the other and respectively consisting of six elements, a multitude of individual elements has to be read. When for example the reading is only started at the second element of a code word, then the residual elements of the first code word have to be read and all elements of the following code word, till a complete code word, in this case the second code word, is recognised.

SUMMARY OF THE INVENTION

The present invention has the object to reduce the error rate.

This is achieved by a method for measuring the height or the height profile of an object, wherein the method comprises the following method steps: projecting a light pattern in form of successive coded picture elements in an extension in direction of a transversal axis onto the object by means of a light source, wherein each of the picture elements has at least one coding feature and the picture elements define together a code word, wherein picture element groups from a sequence of a predetermined number of successive picture elements each define individual partial code words, existing exactly once within the code word, wherein directly neighbouring picture element groups comprise partially the same picture elements and wherein each picture element group is assigned to a specific reference position in direction of the transversal axis in relation to a reference plane; capturing the light pattern by means of a picture sensor, which is arranged off-set to the light source, determining the positions in direction of the transversal axis of the picture element groups and determining the height of the object by means of the determined position of the picture element groups in comparison to the respective reference position, wherein the picture elements are individual light points and wherein the coding feature is the position of the light points in direction transversally to the extension of the light pattern in direction of the sequence of the individual picture elements, wherein the light points are arranged in several lines along the extension of the light pattern.

The whole light pattern forms thus across its whole extension a code word, wherein any one another following picture elements form picture element groups, which define respectively an individual partial code word. In this case, directly neighbouring picture element groups comprise partially the same picture elements. The partial code words overlap according thereto and are not arranged sequentially one after the other. A picture element group can for example consist of five picture elements, which are arranged directly next to each other. These five picture elements can for example comprise the picture elements at the first till fifth position of the light pattern. The directly neighbouring picture element groups comprise then for example the five picture elements on the positions two to six. This means, that in this example, for the determination of a partial code word, always only the number of picture elements, which define the partial code word, have to be read, as at each arbitrary position of the light pattern, five arbitrary picture elements can be read, which produce then a partial code word. Only in the case, when in the above named example, the picture element groups do not directly follow each other, but are for example arranged off-set across two picture elements, i.e. that the second picture element group comprises the picture elements of a third to seventh position, correspondingly more picture elements have to be read, to be able to identify a partial code word.

Each picture element group is assigned to a specific reference position. When the method is used for the volume determination of packages on a conveyor belt, the reference position determines the position of the respective picture element group on the conveyor belt transversally to the conveying direction. If now a package is moved through the light pattern, the picture element groups, which are reflected by the package surface, are transversally displaced to the conveying direction in the reproduction captured by the picture sensor, wherein by means of the size of the displacement, the height of the package can be derived, as the reference position is known. The conveyor belt forms in this case a reference surface, to which the spatial reference position relates.

The coding feature of the picture elements can be different. For example it can be the position of the picture element transversally to the extension of the light pattern, in case of a package volume determination this would be the position of the picture element in conveying direction. Thus the picture elements relative to an axis transversally to the conveying direction can be aligned in different positions in conveying direction. Then, preferably the picture elements are points. The coding feature can however also be the length of the picture element in direction transversally to the extension of the light pattern or the wave length of the light of the picture elements.

Preferably, the picture elements are, as already mentioned above, light points, which are arranged at a distance to each other, which, thus, have no overlapping and which all have the same size and shape.

In the arrangement of the light points in different positions transversally to the extension of the light pattern, i.e. for example in conveying direction of a conveyor belt, the light points can be arranged in several lines, preferably in four lines, along the extension of the light pattern. The light pattern further forms in direction of the extension of the light pattern, columns, which are arranged next to each other and which are aligned in conveying direction. For each column, exactly one light point is provided.

Furthermore, the object is arrived at by a light pattern for use in a method for measuring the height or the height profile of an object, wherein the light pattern has in an extension in direction of a transversal axis successive coded picture elements, which have each at least one coding feature and define together a code word, wherein picture element groups from a sequence of a predetermined number of successive picture elements each define individual partial code words, wherein each picture element group is assigned to a specific reference position in direction of the transversal axis in relation to a reference plane and wherein two directly neighbouring picture element groups comprise partially the same picture elements. The picture elements are individual light points and the coding feature is the position of the light points in direction transversally to the extension of the light pattern in direction of the sequence of the individual picture elements, wherein the light points are arranged in several lines, preferably four lines, along the extension of the light pattern.

BRIEF DESCRIPTION OF THE DRAWINGS

In the following the invention is described in detail with reference to the drawings.

DETAILED DESCRIPTION OF THE PREFERRED EMBODIMENTS

Figure 1:
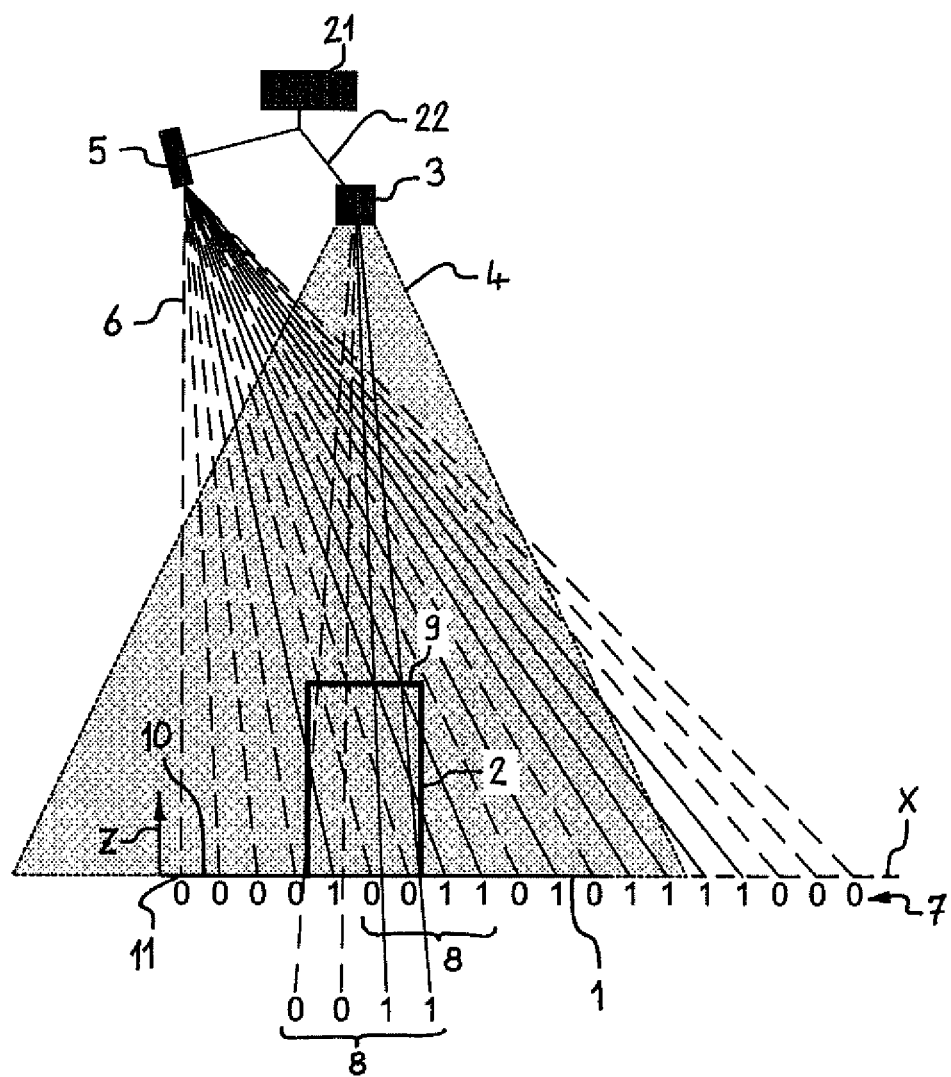
FIG. 1 is a schematical representation of a device according to the invention in the conveying direction of a conveyor belt.

FIG. 1 shows schematically a measuring device for a conveyor belt in a plant for sorting packages. A conveyor belt 1 is provided, which is moved in a conveying direction T vertically to the picture plane. The picture plane corresponds in this case to a measuring plane of the device. The conveyor belt 1 has a surface 10, onto which the packages 2 are put. A package 2 with a rectangular cross-section is shown exemplary. Instead of a conveyor belt 1 also other elements can be provided for conveying the package, as for example driven conveying rollers. A picture sensor in form of a camera 3 is arranged vertically above the conveyor belt 1 and approximately centred thereto. The camera 3 has a viewing range 4, which is indicated by the dashed lines. The viewing range 4 of the camera 3 is arranged on the measuring plane, which is aligned vertically to the conveying direction.

A light source in form of a laser 5 is arranged laterally in direction parallel to a transversal axis X, which intersects the conveyor belt 1 transversally to the conveying direction. The laser 5 projects in a projecting plane 6 a light pattern onto the surface 10 of the conveyor belt 1. The projecting plane 6 is also indicated by dashed lines. The projecting plane 6 is arranged coplanar to the viewing range 4. Generally also other light sources than a laser 5 can be provided. The term "plane" comprises solutions, in which for example the viewing range 4 is widened out in direction to the conveying direction or vertically to the picture plane. This is also valid for the projection plane 6. Especially then, when as following further described, the light pattern does not have only one extension in direction of the transversal axis X, but also in an extension in the conveying direction, a widening of the laser ray takes place and thus of the projecting plane 6 in conveying direction T. In this case attention has to be paid to the fact, that the viewing range of the camera 3 covers a portion on the conveyor belt 1, which is at least as large as or larger than the portion of the projection of the light pattern. When the viewing range on the conveyor belt 1 is larger than the projected light pattern in conveying direction T the advantage is achieved, that an exact coplanar alignment of the viewing range 4 and of the projection plane 6 is not necessary by means of adjusting the camera 3 and the laser 5, as also at a small angular arrangement around a vertical axis Z of the viewing range 4 towards the projection plane 6, the light pattern is arranged completely within the viewing range 4. For this, it is necessary, that the camera 3 is a matrix camera.

Furthermore, it is shown schematically, that the projected light pattern on the conveyor belt 1 is constructed from individual picture elements 11, wherein the picture elements 11 are coded binary in the example of FIG. 1. Each picture element 11 results therefore in a binary number 0 or 1. Together all picture elements 11 form a code word 7 across the width of the conveyor belt 1. The code word 7 is, in the present case, made up from partial code words with four picture elements 11, which form a picture element group 8. Exemplary, a partial code word 8 is marked here, which defines the binary word 0011. The partial code word 8 is clearly and individually identifiable within the code word 7. The partial code word 8 exists exactly once within the code word 7. An exact position along the transversal axis X is assigned to the partial code word 8, wherein this refers to a reference plane, which is represented by the surface 10 of the conveyor belt 1. Thus, if the code word 8 is detected, it is clear, at which position this is arranged on the reference plane.

If the package 2 is now moved through the projection plane 6, individual picture elements 11 of the light pattern are reflected by the surface 9 of the package 2 and are recorded by the camera 3. As the laser 5 is arranged laterally off-set to the camera 3 the partial code word 8 is laterally displaced to the right along the transversal axis X in the picture taken by the camera 3 in the present case. Even though the partial code word 8 is only partially arranged in vertical overlapping with the package 2, the complete partial code word 8 is reflected by the surface 9 of the package 2. In the present case a lateral displacement of two picture elements 11 takes place in this connection. By means of a common triangulation method, then, the height of the surface 9 of the package 2 can be calculated by means of the size of the displacement of the partial code word 8. A picture processing unit 21, for example in the form of a computer, is connected to do this via data lines 22 to the camera 3 and if necessary also to the laser 5.

Figure 2:
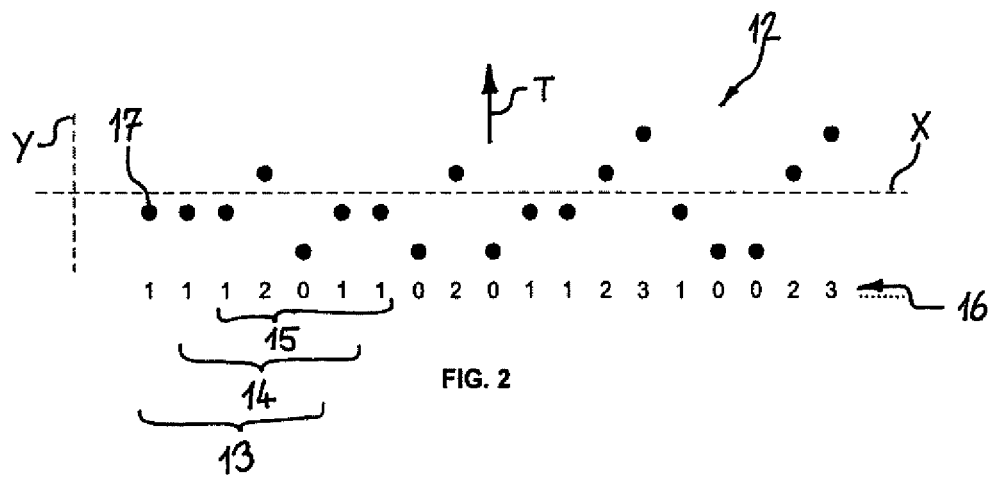
FIG. 2 is a detail of a light pattern.

FIG. 2 shows a detail of a preferred embodiment of a light pattern 12, which defines a code word 16. The light pattern 12 consists of individual picture elements 17 in form of light points, which for example can be formed by means of a laser and/or a DOE (diffractive optical element). The individual picture elements 17 are arranged next to each other in direction to the transversal axis X and thus transversally to the conveying direction T, i.e. in four lines. The lines are arranged one behind the other in longitudinal direction Y, which is aligned parallel to the conveying direction T. The picture points 17 are also arranged in columns, which are arranged next to each other across the transversal direction X, wherein in each column exactly one picture element 17 is provided. The position of the respective picture element 17 represents in longitudinal direction Y or in one of the lines a coding feature, by means of which each individual picture element 17 is coded. Thus, a number can be assigned to each picture element 10, wherein to all picture elements 17 in the lowermost line, shown in FIG. 2, the number 0 is assigned, to all in the second line, arranged above, the number 1 is assigned, to all in the third line the number 2 and to all in the fourth line the number 3 is assigned. Thus, the code word 16 results, which is shown in FIG. 2 below the light pattern 12. The code word 16 forms together with five arbitrary picture elements 17, arranged next to each other, picture element groups or partial code words. The first partial code 13, arranged furthest left, has the coding "11120". A picture element, arranged further to the right, has a second partial code word 14 with the coding "11201". Another third partial code 15, following thereto, has the coding "12011". In this case, all named picture element groups or partial code words 13, 14, 15 overlap, i.e. have partially the same picture elements 17. The first partial code word 13 has, thus, four common picture elements with the second partial code word 14. It is advantageous in this case, that for identifying a partial code word, only five picture elements 7 have to be determined, to be able to carry out a clear assignment of this partial code word within the code word 16.

Figure 3:
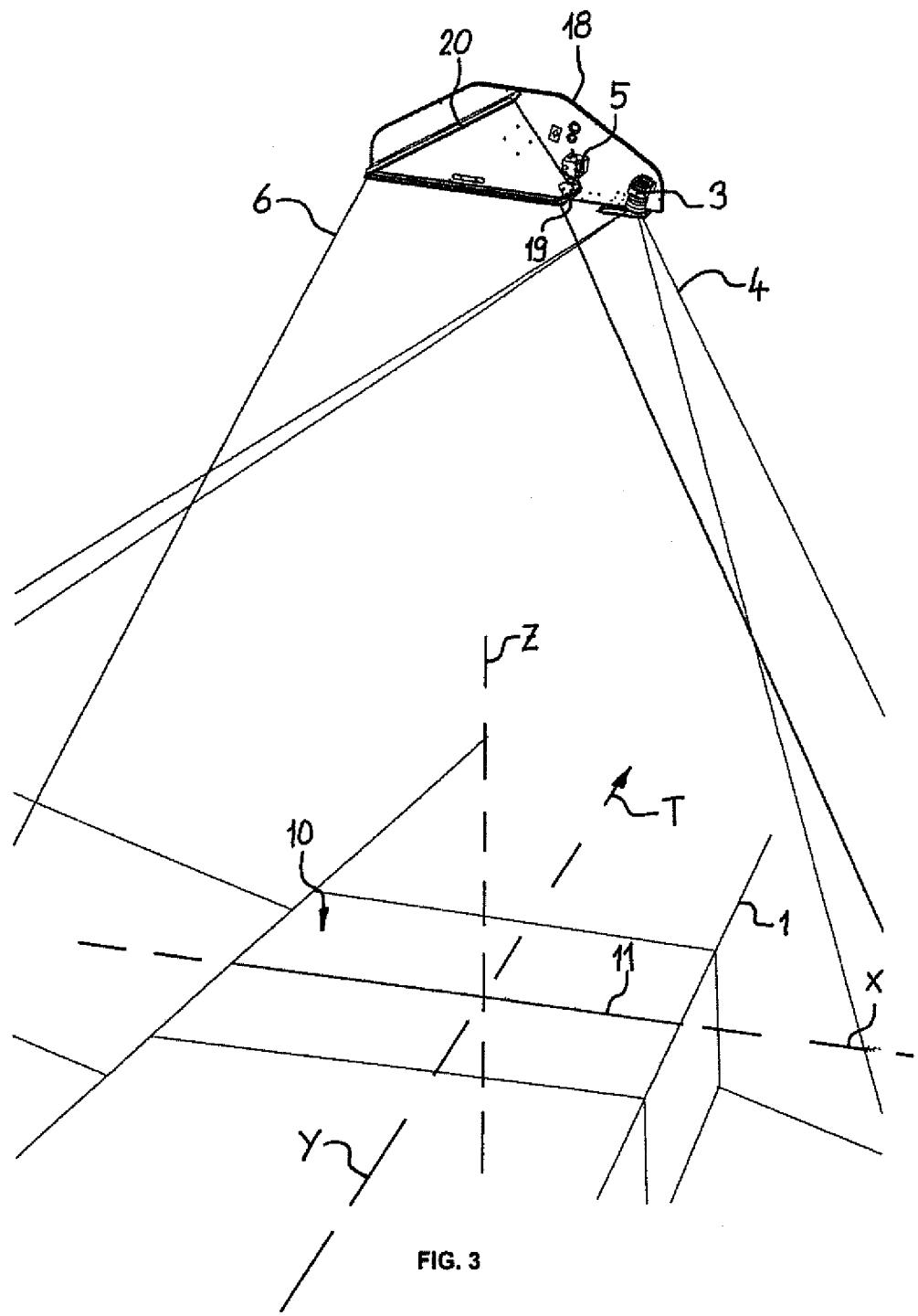
FIG. 3 is a perspective representation of a device according to the invention.

FIG. 3 shows an example of a device for measuring the height or the height profile of an object. Components, which correspond in their function to components of the arrangement according to FIG. 1, are provided with the same reference numerals, even when the arrangement differs from the arrangement of FIG. 1.

The device comprises a housing 18, in which the camera 3 is arranged. The camera 3 has the viewing range 4, which is shown in the present representation perspectively. Here, it is also visible, that the viewing range 4 of the camera 3 does not only widen in direction of the transversal axis X, but also, if only in a small degree, in the direction of the longitudinal axis Y, i.e. parallel to the conveying direction. Within the housing 18, also the laser 5 is arranged, which projects the light pattern in the projection plane 6. It has to be noted, that the projection plane should not be considered purely mathematically, but that this projection plane is also widened fanned out in direction of the transversal axis X as well as in direction of the longitudinal axis Y. The widening of the projection plane 6 in direction of the longitudinal axis Y is however smaller than that of the viewing range 4. If the camera 3 is a matrix camera and the light pattern in conveying direction is smaller than the viewing range 4, an error adjustment, i.e. an angular arrangement of the light pattern relative to the viewing range 4 of the camera 3 can be compensated purely by the computer.

The laser 5 projects initially the light pattern approximately vertically downwards onto a first mirror 19, from where the light pattern is projected in direction of the transversal axis X laterally onto a second mirror 20, which reflects the light pattern then downwards onto the conveyor belt. In this case the light pattern is continuously further widened starting from the laser 5 in direction of the transversal axis X, wherein already when exiting the housing 18, a widely light pattern is provided. If the deflection would not be carried out via the mirrors 19, 20 within the housing 18, the laser 5 would have to be arranged considerably higher above the conveyor belt. Thus, by means of the shown arrangement, considerable construction space is saved.

The invention claimed is:

1. A method for measuring the height of an object, the method comprises the following method steps:
    projecting a light pattern in form of successive picture elements extending in a direction of a transversal axis onto the object by a light source,
    each of the picture elements has at least one coding feature and the picture elements together define a code word,
    picture element groups from a sequence of a predetermined number of the successive picture elements each define individual partial code words which exist exactly once within the code word,
    directly neighbouring picture element groups include partially the same picture elements and
    each picture element group is assigned to a specific reference position in the direction of the transversal axis in relation to a reference plane,
    capturing the light pattern by a picture sensor, the picture sensor is arranged off-set to the light source,
    determining the positions in the direction of the transversal axis of the picture element groups and
    determining the height of the object by the determined position of the picture element groups in comparison to the respective reference position,
    wherein the picture elements are individual light points and the coding feature is the position of the light points in the direction transversally to the extension of the light pattern in the direction of the sequence of the individual picture elements, wherein the light points are arranged in several lines along the extension of the light pattern.

2. The method according to claim 1,
    wherein two neighbouring picture element groups include the same picture elements except one picture element.

3. The method according to claim 1,
    wherein each picture element group is assigned to one specific spatial reference position in relation to a reference surface.

4. The method according to claim 1,
    wherein the picture elements are arranged at a distance to each other.

5. The method according to claim 1,
    wherein the object is moved in a conveying direction through a measuring plane.

6. The method according to claim 5,
    wherein the light source projects the light pattern in the measuring plane.

7. The method according to claim 6,
    wherein the picture sensor is arranged within the measuring plane.

8. An apparatus for measuring the height of an object, comprising:
    a light source that projects a light pattern having successive coded picture elements extending in a direction of a transversal axis,
    each of the successive coded picture elements have at least one coding feature and the successive coded picture elements together define a code word, and picture element groups are formed from a sequence of a predetermined number of successive picture elements each of which define individual partial code words,
    each of the picture element groups is assigned to a specific reference position in a direction of the transversal axis in relation to a reference plane and wherein two directly neighbouring picture element groups include partially the same picture elements,
    wherein the picture elements are individual light points and
    wherein the coding feature is the position of the light points in a direction transversally to the extension of the light pattern in a direction of the sequence of the individual picture elements, wherein the light points are arranged in several lines along the extension of the light pattern.

9. The apparatus according to claim 8, wherein the light points are arranged in four lines along the extension of the light pattern.

* * * * *